US012494970B2

(12) United States Patent
Garuda

(10) Patent No.: US 12,494,970 B2
(45) Date of Patent: Dec. 9, 2025

(54) OPTIMIZATION OF E2 SIGNALING AND REDUCING LOAD AND COMPLEXITY ON ENODEBS/GNODEBS

(71) Applicant: Parallel Wireless, Inc., Nashua, NH (US)

(72) Inventor: Gajanana Garuda, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 336 days.

(21) Appl. No.: 18/055,412

(22) Filed: Nov. 14, 2022

(65) Prior Publication Data

US 2023/0155893 A1 May 18, 2023

Related U.S. Application Data

(60) Provisional application No. 63/278,730, filed on Nov. 12, 2021.

(51) Int. Cl.
*H04L 41/12* (2022.01)
*H04W 84/04* (2009.01)
*H04W 88/16* (2009.01)

(52) U.S. Cl.
CPC ........... *H04L 41/12* (2013.01); *H04W 84/042* (2013.01); *H04W 88/16* (2013.01)

(58) Field of Classification Search
CPC ...... H04L 41/12; H04W 84/042; H04W 88/16
See application file for complete search history.

(56) References Cited

U.S. PATENT DOCUMENTS

| | | | |
|---|---|---|---|
| 9,900,407 B2 | 2/2018 | Mishra et al. | |
| 10,097,992 B2 * | 10/2018 | Sivavakeesar | ........ H04W 60/00 |
| 10,595,242 B2 | 3/2020 | Rao et al. | |
| 10,798,631 B2 | 10/2020 | Agarwal et al. | |
| 10,959,275 B2 | 3/2021 | Mishra et al. | |
| 11,665,597 B2 * | 5/2023 | Gupta | ............... H04W 36/0061 |
| | | | 370/331 |
| 2015/0257051 A1 * | 9/2015 | Rao | .................... H04W 36/0061 |
| | | | 455/552.1 |
| 2018/0160337 A1 * | 6/2018 | Gupta | ............... H04W 36/0016 |
| 2020/0154516 A1 * | 5/2020 | Gambhir-Parekh | .. H04W 76/19 |
| 2020/0196378 A1 * | 6/2020 | Cao | ........... H04B 7/14 |
| 2020/0245202 A1 * | 7/2020 | Rao | .................... H04W 36/0066 |
| 2022/0038902 A1 * | 2/2022 | Mueck | ................ H04W 12/108 |

(Continued)

OTHER PUBLICATIONS

Donnelly: "RIC, xApps, rApps: Who are the key players?", STL Partners, Dec. 2019, https://stlpartners.com/articles/network-innovation/ric-xapps-rapps-who-are-the-key-players/.

(Continued)

*Primary Examiner* — Shean Tokuta
(74) *Attorney, Agent, or Firm* — Michael Y. Saji

(57) ABSTRACT

In a first embodiment, a system may be disclosed, comprising: a plurality of RAN nodes, each with X2 and E2 interface capability; an X2 interface gateway in X2 communication with each of the plurality of RAN nodes; and a near Real-Time RAN Intelligent Controller (near-RT RIC) in communication with the gateway via an E2 interface, The X2 interface gateway provides E2 interface gatewaying for the plurality of RAN nodes with the near-RT RIC, thereby enabling the near-RT RIC to avoid an individual E2 protocol connection with each of the plurality of RAN nodes.

20 Claims, 7 Drawing Sheets

(56) References Cited

U.S. PATENT DOCUMENTS

2024/0236766 A1   7/2024   Shete et al.
2024/0259879 A1   8/2024   Ranganath et al.

OTHER PUBLICATIONS

"LTE; Evolved Universal Terrestrial Radio Access Network (E-UTRAN); X2 general aspects and principles" (3GPP TS 36.420 version 12.0.0 Release 12), 2014-09.

"An Overview of O-RAN Architecture", Parallel Wireless, Jun. 23, 2021, https://www.parallelwireless.com/blog/an-overview-of-o-ran-architecture/.

"Parallel Wireless Creates OpenRAN "All G" Radio Access Network Architecture", Nov. 12, 2020, https://www. parallelwireless.com/wp-content/uploads/Parallel-Wireless_intel_allg.pdf.

"O-RAN Working Group 3Near-Real-time RAN Intelligent Controller Architecture & E2 General Aspects and Principles", O-RAN.WG3.E2GAP-v02.00, 2021.

"O-RAN Working Group 3 Near-Real-time RAN Intelligent Controller E2 Service Model (E2SM)", O-RAN.WG3.E2SM-v02.00, 2021.

"O-RAN Working Group 3Near-Real-time RAN Intelligent Controller E2 Service Model (E2SM), Kpm", O-RAN.WG3. E2SM-KPM-v02.00, 2021.

\* cited by examiner

OPTIMIZATION OF E2 SIGNALING AND REDUCING LOAD AND COMPLEXITY ON ENODEBS/GNODEBS

CROSS-REFERENCE TO RELATED APPLICATIONS

The present application is a non-provisional conversion of, and claims priority under 35 U.S.C. § 119(e) to, U.S. Provisional Patent Application No. 63/278,730, entitled "Optimization of E2 Signaling and Reducing Load and Complexity on eNodeBs/gNodeBs" and filed Nov. 12, 2021, which is hereby incorporated by reference in its entirety for all purposes. In addition, the present application hereby incorporates by reference U.S. Pat. App. Pub. Nos. US20110044285; US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; U.S. Provisional Pat. Application No. 62/804,209, "5G Native Architecture," filed Feb. 11, 2019; and U.S. patent application Ser. No. 17/819,950, "4G/5G Open RAN CU-UP High Availability Solution," filed Aug. 16, 2022.

BACKGROUND

Open RAN is the movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC(RAN Intelligence Controller). Below is the Open RAN architecture as defined by ORAN alliance.

In current Radio Node architecture, RRM functionality resides inside the Radio Node. Open RAN specifications provide a solution to disintegrate eNBs/gNBs into multiple nodes such as CU, DU and near-RT-RIC, which helps in cost reduction and add value in multi-vendor integration and capability. The Open RAN also provides a mechanism to provide value added RRM functionality in Near-RT-RIC by hosting xApps. The xApps will collect lot of information from eNBs/gNBs in real-time to provide optimization and performance improvement of the radio nodes. Many of the information needed by xAPPs are generally carried by X2 interface. This includes: eNodeB/gNodeB status, Load Information, Interference information, Mobility parameters for co-ordination, Mobility Robustness optimizations, Dual connectivity information, Overload information, resource status at each eNB, Any proprietary information via VendorSpecificExtensions, etc.

All these information are very useful for RRM functionality and optimization of RAN. Open RAN specification has defined E2 interface with E2Nodes for collection of these information. For xAPPs to get this information via near-RT-RIC, it needs to subscribe for specific information with eNBs/gNBs via multiple subscriptions using E2 interface defined by Open RAN. xApps needs to subscribe to all the eNodeBs in that area to provide optimization.

SUMMARY

In a first embodiment, a system may be disclosed, comprising: a plurality of RAN nodes, each with X2 and E2 interface capability; an X2 interface gateway in X2 communication with each of the plurality of RAN nodes; and a near Real-Time RAN Intelligent Controller (near-RT RIC) in communication with the gateway via an E2 interface, The X2 interface gateway provides E2 interface gatewaying for the plurality of RAN nodes with the near-RT RIC, thereby enabling the near-RT RIC to avoid an individual E2 protocol connection with each of the plurality of RAN nodes.

The plurality of RAN nodes may be Long Term Evolution (LTE) eNodeBs. The plurality of RAN nodes may be 5G gNodeBs. The plurality of RAN nodes provide an E2 interface to the near-RT RIC. The gateway and the near-RT RIC may be colocated and in an edge cloud.

In a second embodiment, a method may be disclosed, comprising: at an X2 interface gateway in X2 and E2 communication with a plurality of RAN nodes and in E2 communication with a near-Real Time RAN Intelligent Controller (near-RT RIC), providing E2 interface gatewaying for the plurality of RAN nodes with the near-RT RIC, thereby enabling the near-RT RIC to avoid an individual E2 protocol connection with each of the plurality of RAN nodes.

The method may further comprise maintaining a number of active E2 connections between the near-RT RIC and the plurality of RAN nodes that may be less than a cardinality of the plurality of RAN nodes. The method may further comprise reducing E2 connection load at the near-RT RIC. The method may further comprise receiving event information via X2 and sending the event information to the near-RT RIC via E2. The method may further comprise opening, from the near-RT RIC, an E2 connection to a RAN node via the gateway for delivering a control message. The gateway and the near-RT RIC may be colocated and in an edge cloud. The method may further comprise providing, at the gateway, X2GW gateway functionality and X2/E2 bridging gateway functionality. The method may further comprise providing, at the gateway, X2-E2 interworking functionality for event indication messaging.

The near-RT RIC subscribes to X2 related messages from the HNG, and wherein information in the X2 related messages may be stored in the near-RT-RIC and may be used by any of the hosted xApps based on the use cases.

In a third embodiment, a non-transitory computer-readable medium is disclosed providing instructions that, when executed on a processor, perform the following operations: at an X2 interface gateway in X2 and E2 communication with a plurality of RAN nodes and in E2 communication with a near-Real Time RAN Intelligent Controller (near-RT RIC), providing E2 interface gatewaying for the plurality of RAN nodes with the near-RT RIC, thereby enabling the near-RT RIC to avoid an individual E2 protocol connection with each of the plurality of RAN nodes.

The operations may further comprise maintaining a number of active E2 connections between the near-RT RIC and the plurality of RAN nodes that may be less than a cardinality of the plurality of RAN nodes. The operations may further comprise reducing E2 connection load at the near-RT RIC. The operations may further comprise receiving event information via X2 and sending the event information to the near-RT RIC via E2. The operations may further comprise opening, from the near-RT RIC, an E2 connection to a RAN node via the gateway for delivering a control message. The operations may further comprise providing, at the gateway, X2GW gateway functionality and X2/E2 bridging gateway functionality.

DETAILED DESCRIPTION

Figure 1A:
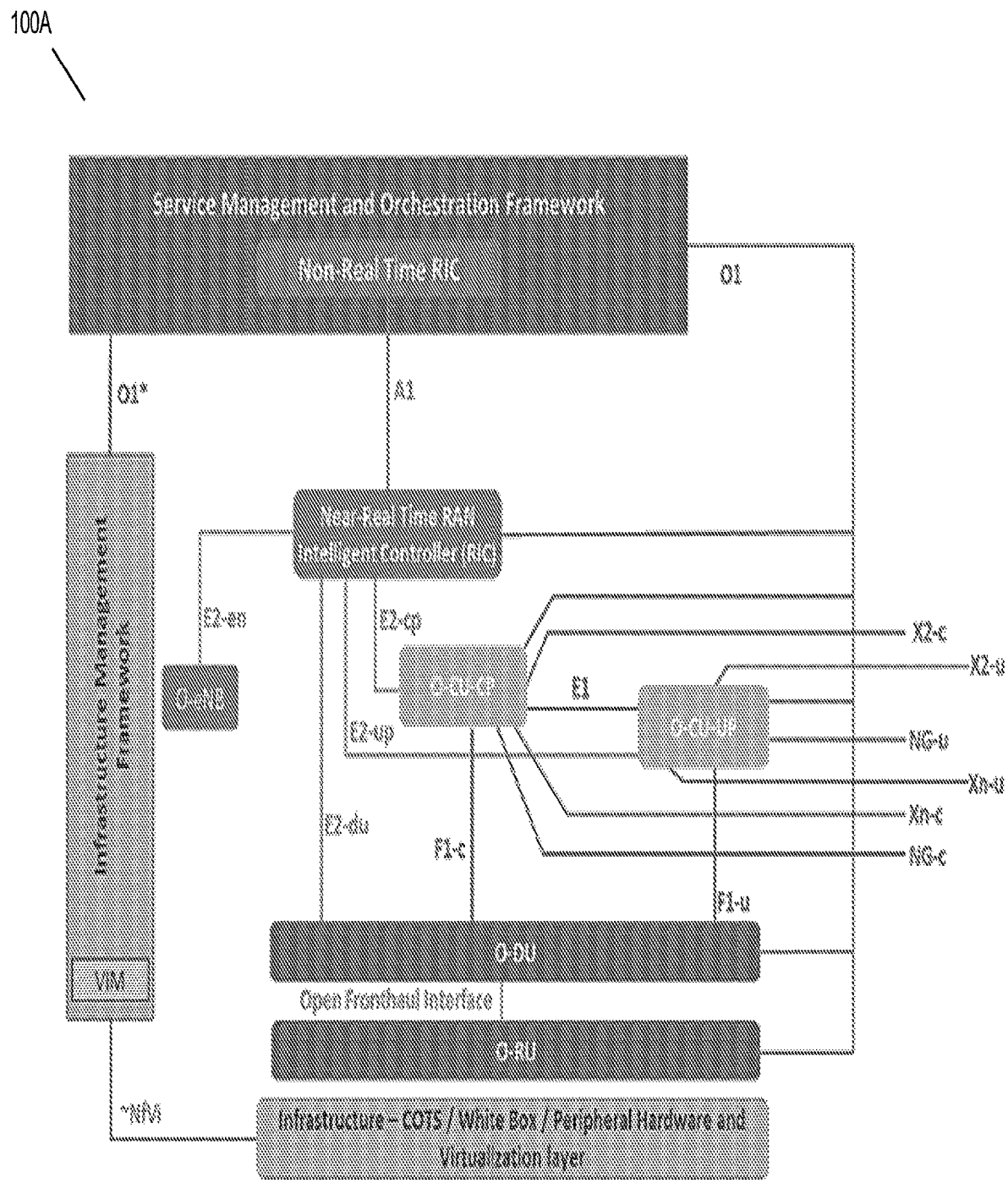
FIG. 1A shows a schematic network architecture diagram according to OpenRAN, as known in the prior art.

A solution is disclosed to identify a mechanism to reduce the number of active E2 connections and load on E2 connections in near-RT-RIC, which will potentially reduce the number of messages sent from E2 node significantly and also reduce the load on E2 Nodes such as eNodeBs/gNodeBs. This also helps in not changing existing eNB architecture significantly for supporting near-RT-RIC interaction.

E2 interfaces needs to be developed on Radio nodes (E2 Nodes) such as eNB, gNB, CU and DU as per Open RAN specifications. A large number of events needs to be sent over E2 interface in real-time whenever such indications are sent/received over X2 interfaces. The information sent via E2 is generally the same information which are exchanges in X2 interface. This adds additional complexity and processing in E2 nodes. Radio nodes are generally designed with less CPU and memory. Supporting this will existing radio node need lot of infra-structure changes as well.

In the present disclosure, the term "RIC" refers to a near-real time (near-RT) radio access network (RAN) intelligent controller (RIC) or near-RT RIC, which is understood to include the near-RT RIC defined in the specifications published by the O-RAN Alliance Near-RT RIC and E2 Interface Workgroup (WG3), such as: "0-RAN Near-RT RIC and E2 Interface: Use Cases and Requirements v1.0," "0-RAN E2 General Aspects and Principles (E2GAP) v2.0," "0-RAN E2 Application Protocol (E2AP) v2.0 ," "0-RAN E2 Service Model (E2SM) v2.0," "0-RAN E2 Service Model: RAN Control (E2SM-RC) v1.0," "0-RAN E2 Service Model: Key Performance Measurement (E2SM-KPM) v2.0," or other specifications, each of which is hereby incorporated by reference for all purposes. In some cases the term "RIC" may also be understood to mean a non-RT RIC where appropriate. E2 can provide services to perform RAN control, modify RAN configuration, and obtain UE context-related information, among other functions. The UE context-related information measurements may include measurements from a distributed unit (DU), centralized unit (CU), control plane (CP), user plane (UP), etc.

A near-RT RIC is understood to provide control functions for a RAN that are dynamic and change over time based on coordination with the RAN and the core network (4G core or 5G core as appropriate). The RIC provides an execution environment for applications, known as "xApps," which can utilize for their inputs a comprehensive set of information about the RAN that has been received at the RIC. By utilizing the available RAN information, the xApps are able to provide the dynamic coordination and control functionality.

Where eNodeBs are described throughout the present disclosure, it is understood that any E2 interface-compatible RAN nodes could be substituted in, including gNodeBs, 5GNR base stations, base stations configured for use with EPC (non-standalone or NSA) or standalone 5G cores (SA), etc. Where X2 is described herein, Xx or Xn is also understood to be substitutable wherever appropriate.

Notably, the existing architecture needs all eNBs/gNBs to support E2 interfaces and E2Nodes (such as eNB, gNB, CU, DU) shall report all the events which happens in X2 interface with neighboring eNBs/gNBs. The events will be sent based on the subscription from the xApp and there could be many subscriptions from different xAPPs via E2 interface. This adds more processing at E2 nodes and duplication of information sent via X2 and E2. In case of 4G changing the existing RRM functionality and adding more modules to handle this requirement cause instability and complexity. These problems are addressed in the present disclosure.

FIG. 1A shows a schematic network architecture diagram 100A according to OpenRAN. The role of the near-RT RIC is shown. The Near-RT RIC occupies a central role in the network, communicating, via various E2 messages and interfaces, to different RAN nodes, shown as O-eNB, O-CU-CP, O-CU-UP, O-DU; and communicating via A1 interface messages to a Non-Real-Time RIC for additional service management and orchestration.

Figure 1B:
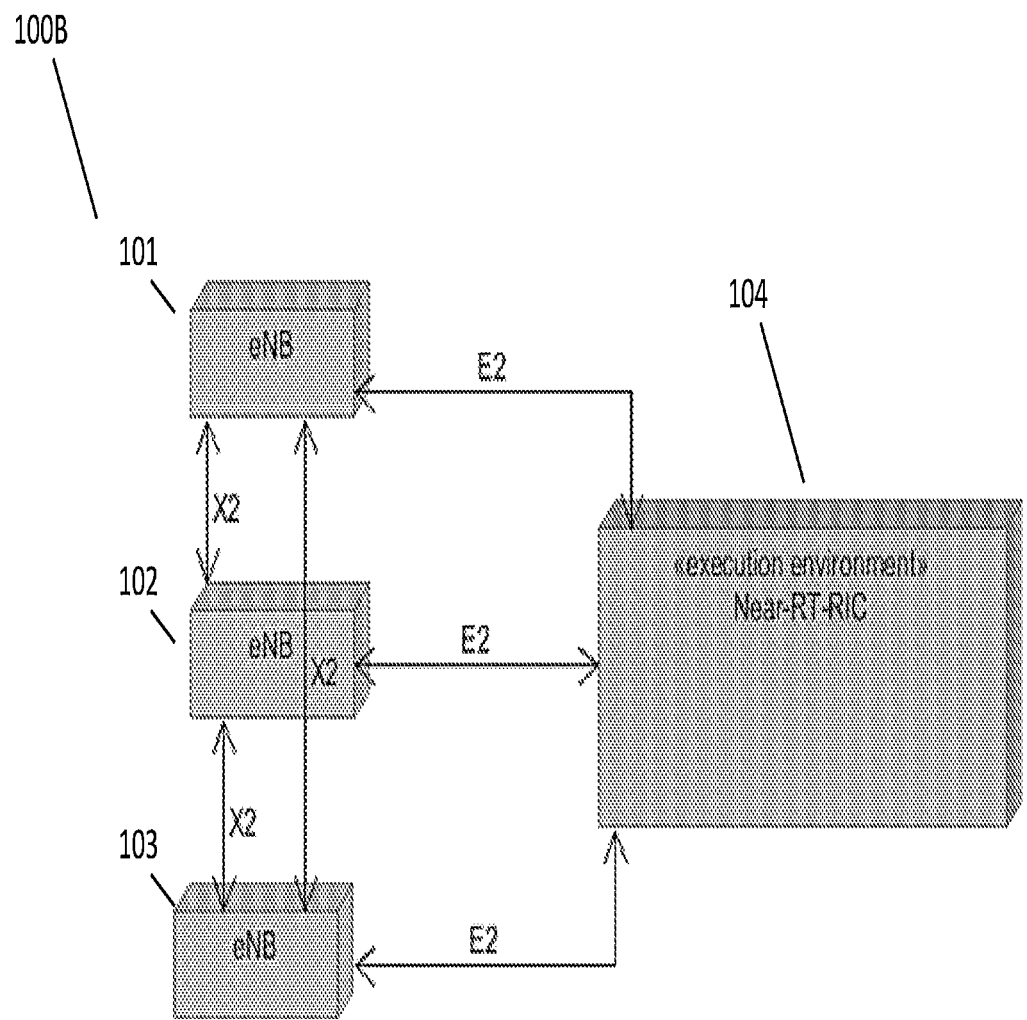
FIG. 1B shows a detail of a schematic network architecture diagram according to OpenRAN with a near-RT RIC, as known in the prior art.

FIG. 1B shows a detail of a schematic network architecture diagram 100B according to OpenRAN with a near-RT RIC, as known in the prior art. RAN nodes 101, 102, 103 are shown; they are in communication with each other via X2 and with Near-RT RIC via 104. The Near-RT RIC 104 provides an execution environment that relies on its ability to obtain information regarding the eNodeBs via E2. Each eNodeB requires its own E2 connection to Near-RT RIC 104. No X2 gateway is provided. Here each eNB/gNB will connect to neighboring eNB/gNB via X2. The information which is exchanged via X2 also needs to be sent via E2 in some format.

Figure 2:
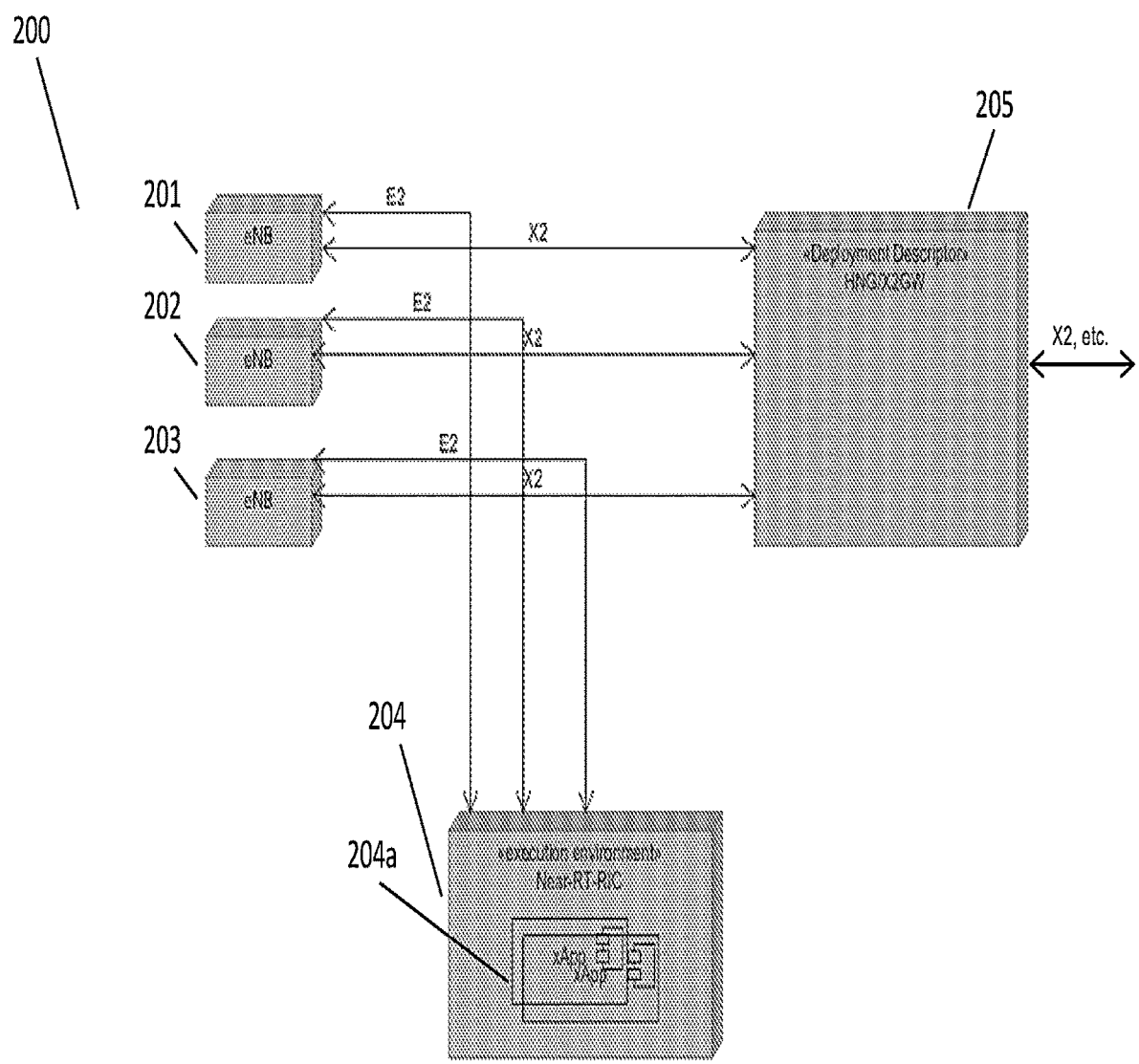
FIG. 2 shows a schematic network architecture diagram with a gateway and a near-RT RIC, in accordance with some embodiments.

FIG. 2 shows a schematic network architecture diagram 200 with a gateway and a near-RT RIC, in accordance with some embodiments. RAN nodes 201, 202, 203 are in communication over E2 to near-RT RIC 204 and over X2 to gateway 205. Gateway 205 is in communication with the 4G EPC core via X2, as shown, and potentially may additionally be in communication over S1 or other interfaces as appropriate for managing RAN nodes 201, 202, 203. Gateway 205 may also provide gatewaying of X2 communication with other RAN nodes via its upstream X2 connection, as well as among RAN nodes 201, 202, 203. Gateway 205 thus provides a gateway for X2 communication. However, gateway 205 does not provide a gateway functionality for Near-RT RIC 204 over E2, and each eNodeB requires its own E2 connection to Near-RT RIC 104. Where X2 communication is mentioned, it is understood that other X2-related interfaces are also intended where appropriate, such as X2-c, X2-u, Xn-u, Xn-c, etc. The presence of the X2GW adds optimization with respect to number of X2 connections, but still eNB needs to send this information separately via E2 interface to near-RT-RIC.

Figure 3:
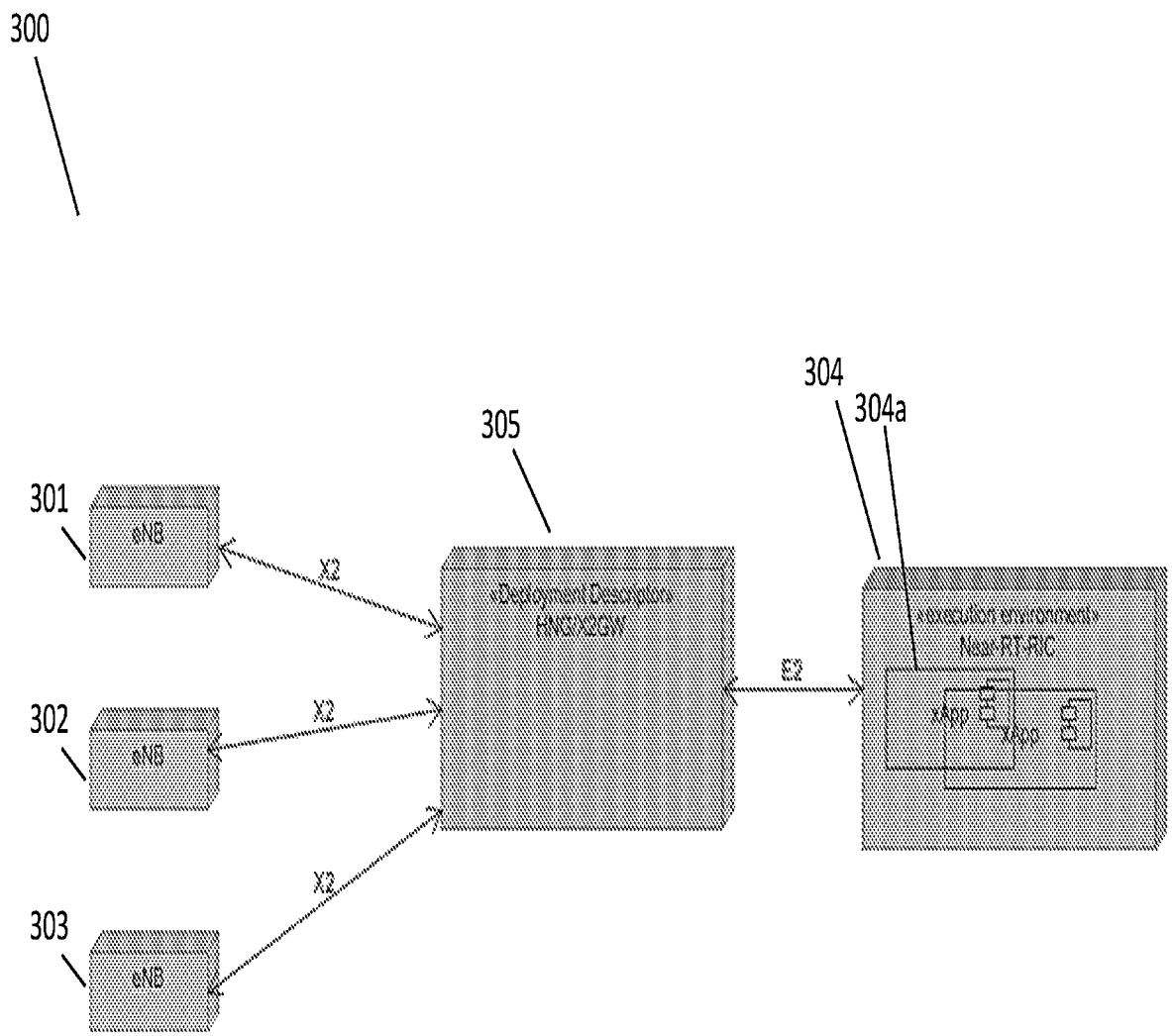
FIG. 3 shows a further schematic network architecture diagram with a gateway and a near-RT RIC, in accordance with some embodiments.

FIG. 3 shows a further schematic network architecture diagram with a gateway and a near-RT RIC, in accordance with some embodiments. Gateway 305, which provides X2 gatewaying as described in relation to FIG. 2, now also provides E2 gatewaying functionality from the RAN nodes 301, 302, 303 to upstream nodes such as Near-RT RIC 304, and provides an appropriate execution environment 304a for performing dynamic control of the RAN. The gateway 305 acts as X2GW for eNBs. This helps in reducing the number of X2 connections from eNB s.

As shown in FIG. 3, near-RT-RIC will establish an E2 interface with HNG/X2GW and subscribe to X2 related messages. The information in X2 messages will be sent from HNG. The information in these messages will be stored in near-RT-RIC which could be used by any of the hosted xApps based on the use cases. This solution will be applicable for $3^{rd}$ party X2GW (in case of 4G) OR XnGW (in case of 5G). This solution will have following advantages.
1. The number of active E2 connections on the near-RT-RIC with each eNB/gNB/CU/DU.
2. Massive load on E2 connections will be reduced significantly.
3. Duplication of events on E2 Nodes (eNB/gNB/CU/DU). The same information is sent in X2 and E2.
4. Load and processing on E2 Nodes is improved.
5. If some action command needs to be imposed on E2node, then only near-RT-RIC can open an E2 connection and inform through RIC Control message.
6. By architecture X2GW/XnGW and near-RT-RIC can be deployed in edge cloud. It is possible that both can share the same cluster and data can be shared between them.

Figure 4:
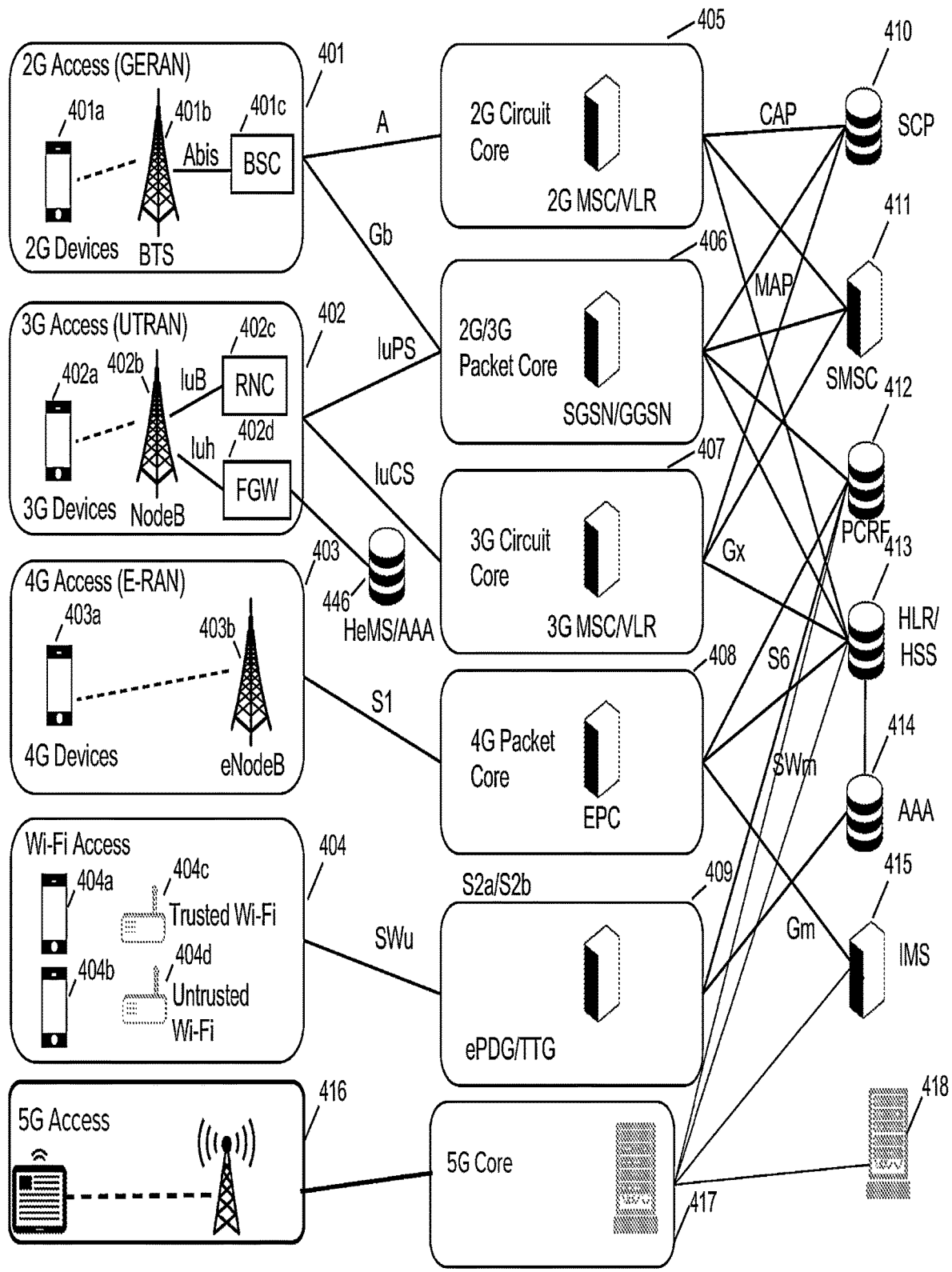
FIG. 4 shows a schematic network architecture diagram for 4G and other-G networks, in accordance with some embodiments.

FIG. 4 shows a schematic network architecture diagram for 4G and other-G networks, in accordance with some embodiments. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
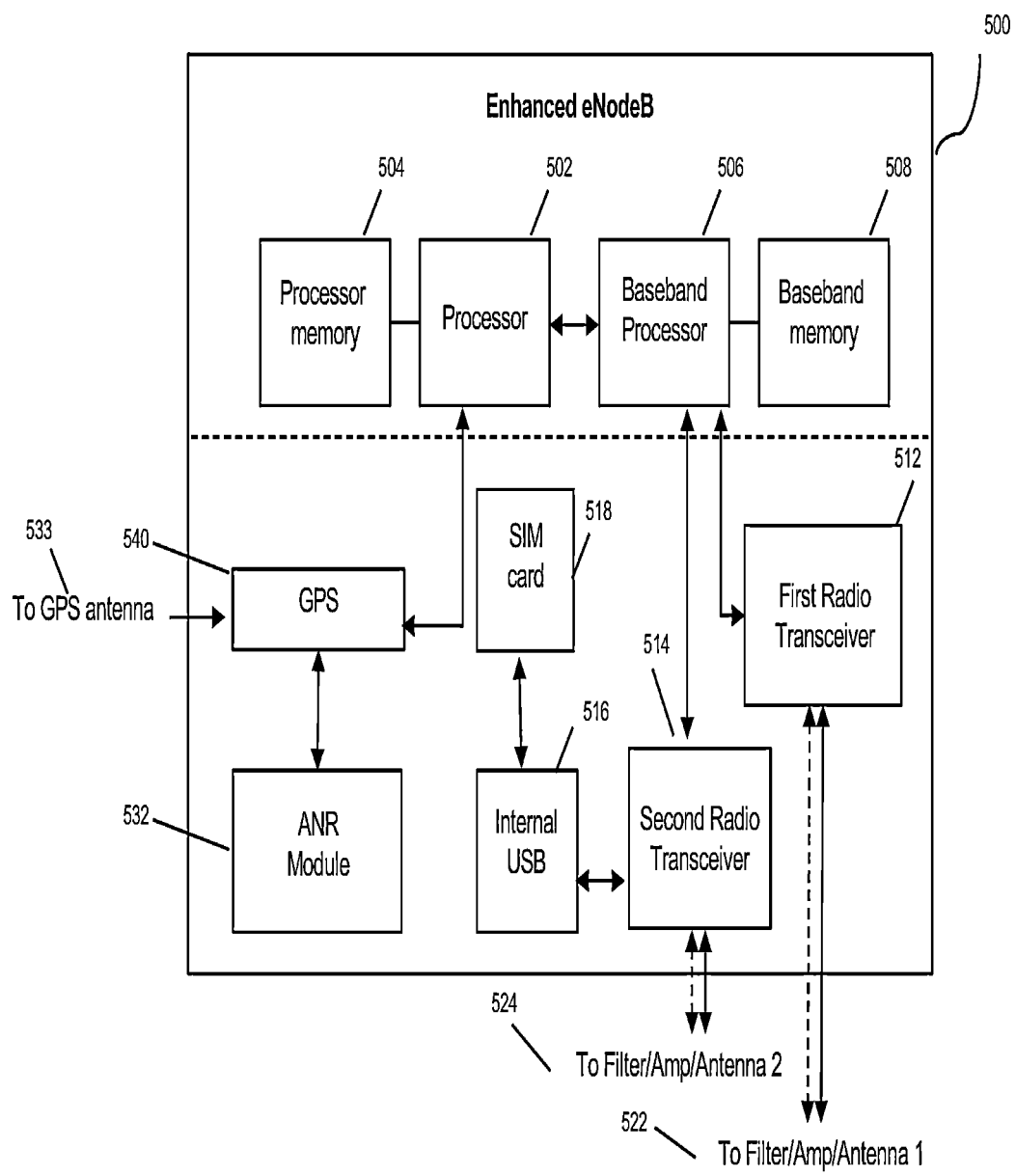
FIG. 5 is an enhanced eNodeB for performing the methods described herein, in accordance with some embodiments.

FIG. 5 is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 6:
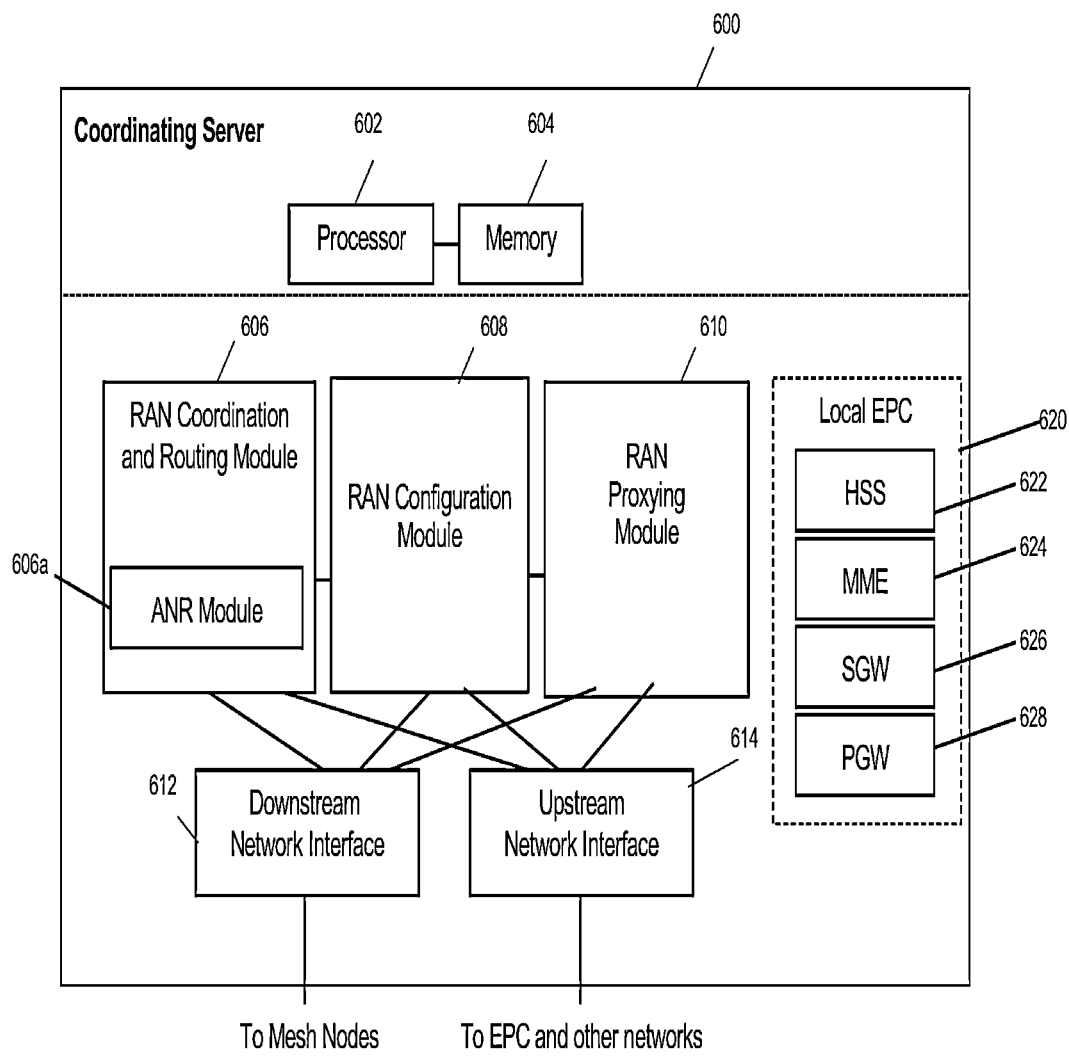
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein, in particular the E2 gatewaying functionality and the X2 gatewaying functionality. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, where any function of a gateway is described as gatewaying, it is understood to encompass various semantics that are commonly used at a gateway, such as proxying, back-to-back user agent (B2BUA) systems, aggregating, changing header information, interworking between or among protocols or interfaces, rewriting data to reencapsulate it into another protocol, stateful or stateless proxying, etc.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A system, comprising:
   a plurality of RAN nodes, each with X2 and E2 interface capability;
   an X2 interface gateway in X2 communication with each of the plurality of RAN nodes; and
   a near Real-Time RAN Intelligent Controller (near-RT RIC) in communication with the gateway via an E2 interface,
   wherein the X2 interface gateway provides E2 interface gatewaying for the plurality of RAN nodes with the near-RT RIC, thereby enabling the near-RT RIC to avoid an individual E2 protocol connection with each of the plurality of RAN nodes.

2. The system of claim 1, wherein the plurality of RAN nodes are Long Term Evolution (LTE) eNodeB s.

3. The system of claim 1, wherein the plurality of RAN nodes are 5G gNodeBs.

4. The system of claim 1, wherein the plurality of RAN nodes provide an E2 interface to the near-RT RIC.

5. The system of claim 1, wherein the gateway and the near-RT RIC are colocated and in an edge cloud.

6. A method, comprising: at an X2 interface gateway in X2 and E2 communication with a plurality of RAN nodes and in E2 communication with a near-Real Time RAN Intelligent Controller (near-RT RIC), providing E2 interface gatewaying for the plurality of RAN nodes with the near-RT RIC, thereby enabling the near-RT RIC to avoid an individual E2 protocol connection with each of the plurality of RAN nodes.

7. The method of claim 6, further comprising maintaining a number of active E2 connections between the near-RT RIC and the plurality of RAN nodes that is less than a cardinality of the plurality of RAN nodes.

8. The method of claim 6, further comprising reducing E2 connection load at the near-RT RIC.

9. The method of claim 6, further comprising receiving event information via X2 and sending the event information to the near-RT RIC via E2.

10. The method of claim 6, further comprising opening, from the near-RT RIC, an E2 connection to a RAN node via the gateway for delivering a control message.

11. The method of claim 6, wherein the gateway and the near-RT RIC are colocated and in an edge cloud.

12. The method of claim 6, further comprising providing, at the gateway, X2GW gateway functionality and X2/E2 bridging gateway functionality.

13. The method of claim 6, further comprising providing, at the gateway, X2-E2 interworking functionality for event indication messaging.

14. The method of claim 6, wherein the near-RT RIC subscribes to X2 related messages from the HNG, and wherein information in the X2 related messages is stored in the near-RT-RIC and is used by any of the hosted xApps based on the use cases.

15. A non-transitory computer-readable medium providing instructions that, when executed on a processor, perform the following operations: at an X2 interface gateway in X2 and E2 communication with a plurality of RAN nodes and in E2 communication with a near-Real Time RAN Intelligent Controller (near-RT RIC), providing E2 interface gatewaying for the plurality of RAN nodes with the near-RT RIC, thereby enabling the near-RT RIC to avoid an individual E2 protocol connection with each of the plurality of RAN nodes.

16. The computer-readable medium of claim 15, the instructions further comprising maintaining a number of active E2 connections between the near-RT RIC and the plurality of RAN nodes that is less than a cardinality of the plurality of RAN nodes.

17. The computer-readable medium of claim 15, the instructions further comprising reducing E2 connection load at the near-RT RIC.

18. The computer-readable medium of claim 15, the instructions further comprising receiving event information via X2 and sending the event information to the near-RT RIC via E2.

19. The computer-readable medium of claim 15, the instructions further comprising opening, from the near-RT RIC, an E2 connection to a RAN node via the gateway for delivering a control message.

20. The computer-readable medium of claim 15, the instructions further comprising providing, at the gateway, X2GW gateway functionality and X2/E2 bridging gateway functionality.

* * * * *